Nov. 28, 1933.    G. ODUM    1,937,240
VALVE FACING APPARATUS
Filed Feb. 20, 1933    2 Sheets-Sheet 1
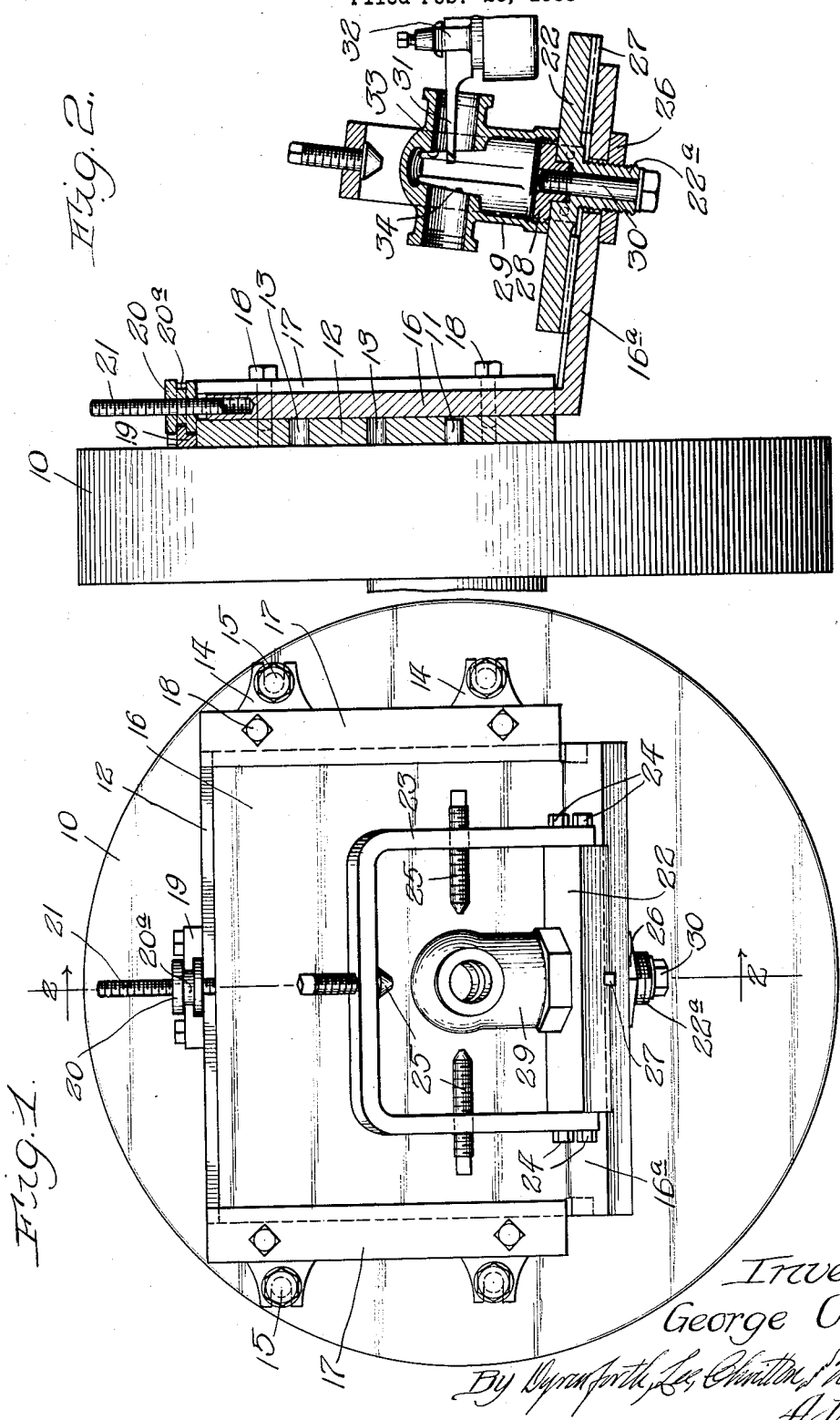

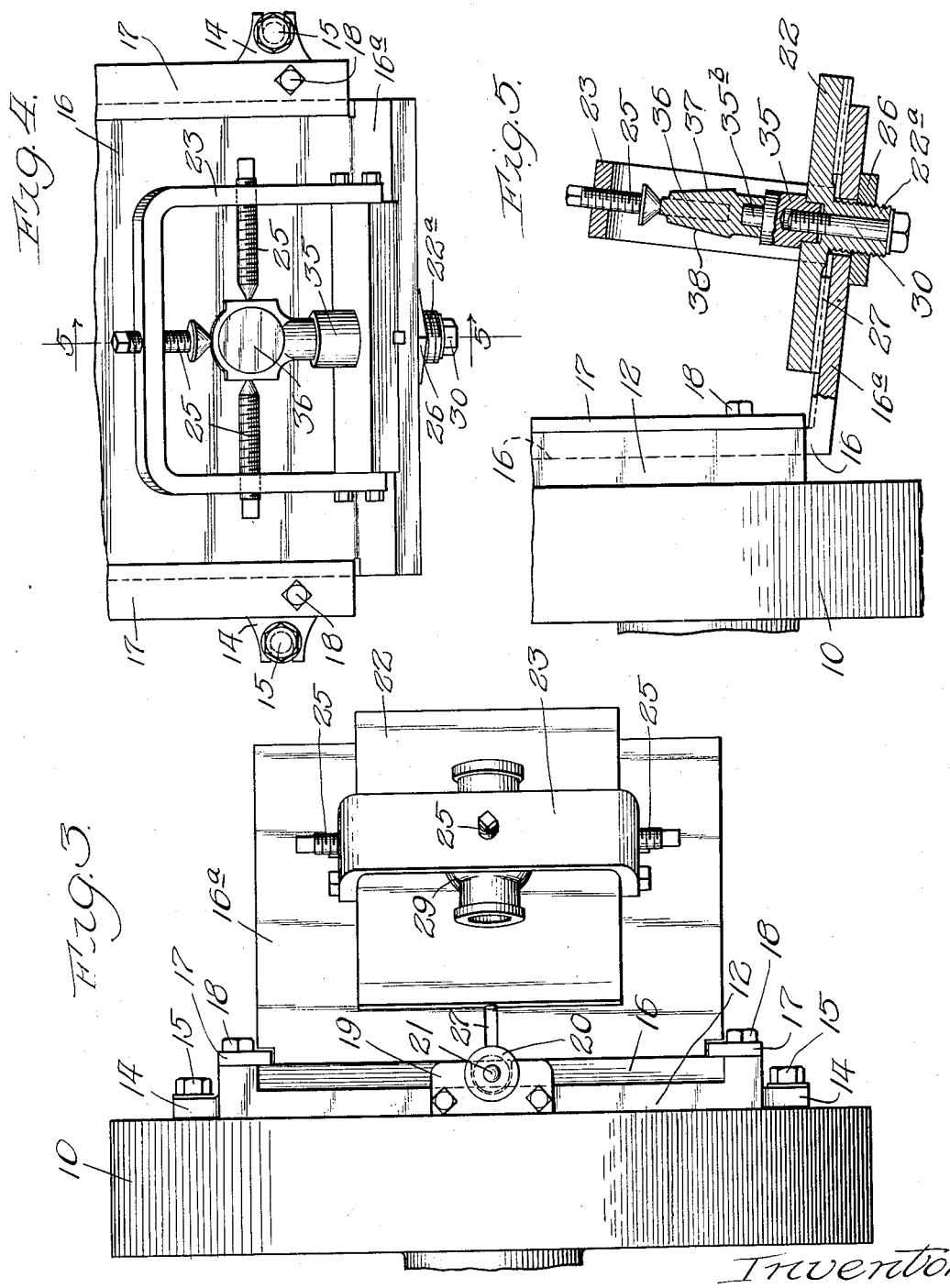

Patented Nov. 28, 1933

1,937,240

UNITED STATES PATENT OFFICE 1,937,240

VALVE FACING APPARATUS

George Odum, Chicago, Ill.

Application February 20, 1933. Serial No. 657,719

6 Claims. (Cl. 82—40)

This invention relates to improvements in valve grinding apparatus and, more especially, apparatus for facing, machining, regrinding or reclaiming gate valves, and the like. My apparatus is especially adapted for attachment to a lathe, boring mill, or other similar machine, with a spindle, face plate, or the like, adapted to impart rotation.

Among the features of my invention is the provision of apparatus that can be easily and cheaply made and which will permit efficient regrinding, refacing, and the like, of the body seats and gates of gate valves.

Other features and advantages of my invention will appear more fully as I proceed with my specification.

For the purpose of illustrating my invention, I have here shown it as designed for use on a lathe. To this end I have illustrated the face plate of a lathe. It is to be understood, however, that with slight changes it can be adapted for use with boring mills and substantially any machine having a rotating part to which the base of my apparatus can be attached and provided with means for supporting a tool adjacent thereto.

In that form of device embodying the features of my invention shown in the accompanying drawings—

Figure 1 is a view in front elevation showing the valve body mounted in my apparatus for grinding the body seats; Fig. 2 is a view taken as indicated by the line 2 of Fig. 1; Fig. 3 is a top plan view; Fig. 4 is a fragmentary view similar to Fig. 1 showing the gate mounted in the apparatus; and Fig. 5 is a view taken as indicated by the line 5 of Fig. 4.

As shown in the drawings, 10 may indicate, for example, the face plate of a lathe. 11 indicates a pin centrally arranged in the face plate. 12 indicates a base provided with a central vertical row of holes 13, 13. As here shown, there are three of these holes. The pin 11 is adapted to fit into one of these holes. This permits the mounting of the base plate 12 on the face plate 10 in a plurality of positions and insures that in each case, the hole 13 embracing the pin 11 is centrally arranged with respect to the face plate 10. 14, 14 indicate slotted ears on the base 12 to receive the machine screws or bolts 15 to assist in fastening the base 12 firmly to the first plate 10 of the lathe.

Adjustably mounted on the base 12 is an angle member including the upper plate 16 lying against the base 12 and the lower plate 16$^a$. 17, 17 indicate plates removably attached to the base 12 by the cap screws 18 at the sides of the plate 16. These plates 17 overlap the edges of the plate 16 so that when the cap screws 18 are tightened, the plate 16 is firmly held in position against the base 12. 19 indicates a thrust bracket mounted on the base 12, adapted to engage the slot 20$^a$ in the nut 20, which latter engages the screw 21 mounted in the upper edge of the plate 16. Rotation of the nut 20 will, therefore, serve to adjust the plate 16 vertically with respect to the base 12.

Mounted on the lower plate 16$^a$ of the angle plate is a work-supporting table 22. 23 indicates a box bracket bolted to the table 22 by the screws 24. This box bracket is provided with three holes tapped centrally with respect to the index table or work-supporting table 22 to receive the cone head set screws 25, 25. These latter are used to assist in holding the gate or valve wedge in position, as will be hereinafter described. They may also be used to assist in holding the body of the valve in position, but, as here shown, such use is not made of these screws when the valve body is being operated upon.

22$^a$ indicates a depending hollow threaded projection or lug centrally arranged on the table 22 and adapted to extend through an opening provided for the same in the plate 16$^a$. 26 indicates a nut under the plate 16$^a$ threaded on the lug 22$^a$ to hold the table 22 firmly in position on the plate 16$^a$. The plate 16$^a$ and the table 22 may be provided with cooperating key-ways to embrace the key 27 to assist in preventing rotation of the table 22 on the plate 16$^a$.

28 indicates a plug adapted to be screwed into the valve body 29. This plug is centrally tapped to receive a screw or draw bolt 30 extending through the bore in the lug 22$^a$. Tightening the screw or draw bolt 30 holds the valve body 29 firmly in position on the work table 22.

The lower plate 16$^a$ of the angle member is angularly positioned with respect to the upper plate 16 so that when the valve body is in place, the valve seat to be ground will be perpendicular. In other words, the angular relation between the parts 16 and 16$^a$ of the angle member is a little more than 90° and such as to compensate for the angular inclination of the valve seat in the valve body. When the body is adjusted in position, it is machined by using a back facing boring tool such as the tool 31 mounted in the tool holder 32. As shown in Fig. 2, the seat being machined is indicated by 33. After the seat 33 is machined, the work table 22 is rotated 180° to bring the other seat 34 into position for machining.

Figs. 4 and 5 show the gate or wedge of the valve mounted in order to machine its faces. For this purpose I provide a plug 35 with a lower projection 35ª that seats in the hole in the work table 22. The plug 35 is tapped to receive the draw bolt 30. The upper end of the plug 35 is provided with a cylindrical projection 35ᵇ seating in the cavity in the valve gate or wedge 36. When the gate is thus positioned, the screws 25 are tightened to hold the same firmly in place. When the gate is mounted as shown in Fig. 5, the face 37 is adapted to be machined. When this face is finished, the work table 32 may be rotated 180° to machine the opposite face 38.

I have shown the seats on the gate and body machined by a suitable boring tool or the like. It is obvious that they may be ground, dressed or otherwise finished by suitable tools.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. Apparatus of the character described, including; a base; means for attaching the base to the face plate of a lathe, or the like; an angle member having one part adjustably mounted on the base and another part adapted to support a work table; a work table mounted on the angle member; and means for supporting a gate on the work table.

2. Apparatus as claimed in claim 1, in which the means for supporting the gate includes a box bracket carrying centering screws.

3. Apparatus of the character described, including; a base provided with a vertical row of holes adapted to receive a pin carried in the center of a face plate of a lathe or the like to permit mounting of the base on the face plate with said pin in one of said holes in any one of a plurality of vertically related positions; means for attaching said base to such a face plate with said pin in one of said holes; an angle member including an upper plate carrying a lower plate forming an angle therewith slightly greater than 90°; means for adjustably mounting the upper plate of the angle member on the base; a work table; means for mounting the work table on the lower plate of the angle member; and means for mounting a valve body on said work table.

4. Apparatus as claimed in claim 3, in which the work table is rotatably mounted upon the lower plate of the angle member.

5. Apparatus of the character described, including; a base; means for attaching the base to the face plate of a lathe, or the like; an angle member having one part adjustably mounted on the base and another part adapted to support a work table; a work table mounted on the angle member; and means for supporting a valve body on the work table, said means including an internally threaded plug adapted to be inserted into the valve body and a draw bolt adapted to be screwed into the plug and draw the same down onto the work table.

6. Apparatus as claimed in claim 5, in which the work table is rotatably supported on the angle member.

GEO. ODUM.